United States Patent
Singh et al.

(10) Patent No.: US 9,128,712 B2
(45) Date of Patent: Sep. 8, 2015

(54) ELECTRONIC DEVICE INCLUDING TOUCH-SENSITIVE DISPLAY AND METHOD OF DETECTING TOUCHES

(75) Inventors: Amit Pal Singh, Waterloo (CA); John Edward Dolson, Carp (CA); Premal Vinodchandra Parekh, Waterloo (CA)

(73) Assignee: BlackBerry Limited, Waterloo (CA)

( * ) Notice: Subject to any disclaimer, the term of this patent is extended or adjusted under 35 U.S.C. 154(b) by 74 days.

(21) Appl. No.: 13/572,401

(22) Filed: Aug. 10, 2012

(65) Prior Publication Data

US 2014/0043247 A1  Feb. 13, 2014

(51) Int. Cl.
*G06F 1/32* (2006.01)
*G06F 3/044* (2006.01)
*G06F 3/0488* (2013.01)

(52) U.S. Cl.
CPC ............ *G06F 1/3218* (2013.01); *G06F 1/3262* (2013.01); *G06F 3/044* (2013.01); *G06F 3/04883* (2013.01); *G06F 2203/04106* (2013.01)

(58) Field of Classification Search
CPC .......... G06F 3/044; G06F 2203/04106; G06F 2203/04111
USPC .................. 345/211, 156, 173–179; 713/300; 178/18.01–18.09; 463/37–38
See application file for complete search history.

(56) References Cited

U.S. PATENT DOCUMENTS

| 6,239,988 | B1 * | 5/2001 | Marziale et al. | 363/16 |
| 2008/0192019 | A1 * | 8/2008 | Lee et al. | 345/173 |
| 2008/0291176 | A1 * | 11/2008 | Ito | 345/174 |
| 2010/0253638 | A1 * | 10/2010 | Yousefpor et al. | 345/173 |
| 2011/0025635 | A1 * | 2/2011 | Lee | 345/173 |
| 2011/0115733 | A1 | 5/2011 | Shih | |
| 2011/0234523 | A1 * | 9/2011 | Chang et al. | 345/173 |
| 2011/0248940 | A1 * | 10/2011 | Chuang et al. | 345/173 |
| 2012/0062482 | A1 * | 3/2012 | Ding et al. | 345/173 |
| 2013/0113722 | A1 * | 5/2013 | Lee et al. | 345/173 |
| 2013/0265276 | A1 * | 10/2013 | Obeidat et al. | 345/174 |

FOREIGN PATENT DOCUMENTS

EP  2352073 A1  8/2011

OTHER PUBLICATIONS

Extended European Search Report dated Dec. 20, 2012, issued in respect of corresponding European Patent Application No. 12180099.9.
Examiner's Report dated Sep. 8, 2014 issued in respect of corresponding Canadian Patent Application No. 2,820,913.
Notice of Final Rejection dated Mar. 23, 2015, issued in respect of corresponding Korean Patent Application No. 10-2013-0094602.

* cited by examiner

*Primary Examiner* — Md Saiful A Siddiqui
(74) *Attorney, Agent, or Firm* — Geoffrey deKleine; Borden Ladner Gervais LLP

(57) ABSTRACT

An electronic device includes a touch controller, sense electrodes operably coupled to the touch controller, a display controller operably coupled to the touch controller to communicate with the touch controller to detect touches, and drive electrodes operably coupled to the touch controller when the electronic device is operating in a reduced power condition and operably coupled to the display controller when the electronic device is operating in a normal power condition.

13 Claims, 3 Drawing Sheets

ELECTRONIC DEVICE INCLUDING TOUCH-SENSITIVE DISPLAY AND METHOD OF DETECTING TOUCHES

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touchscreen display, is particularly useful on handheld devices, which are small and may have limited space for user input and output. The information displayed on the display may be modified depending on the functions and operations being performed.

Improvements in electronic devices with touch-sensitive displays are desirable.

DETAILED DESCRIPTION

Figure 1:
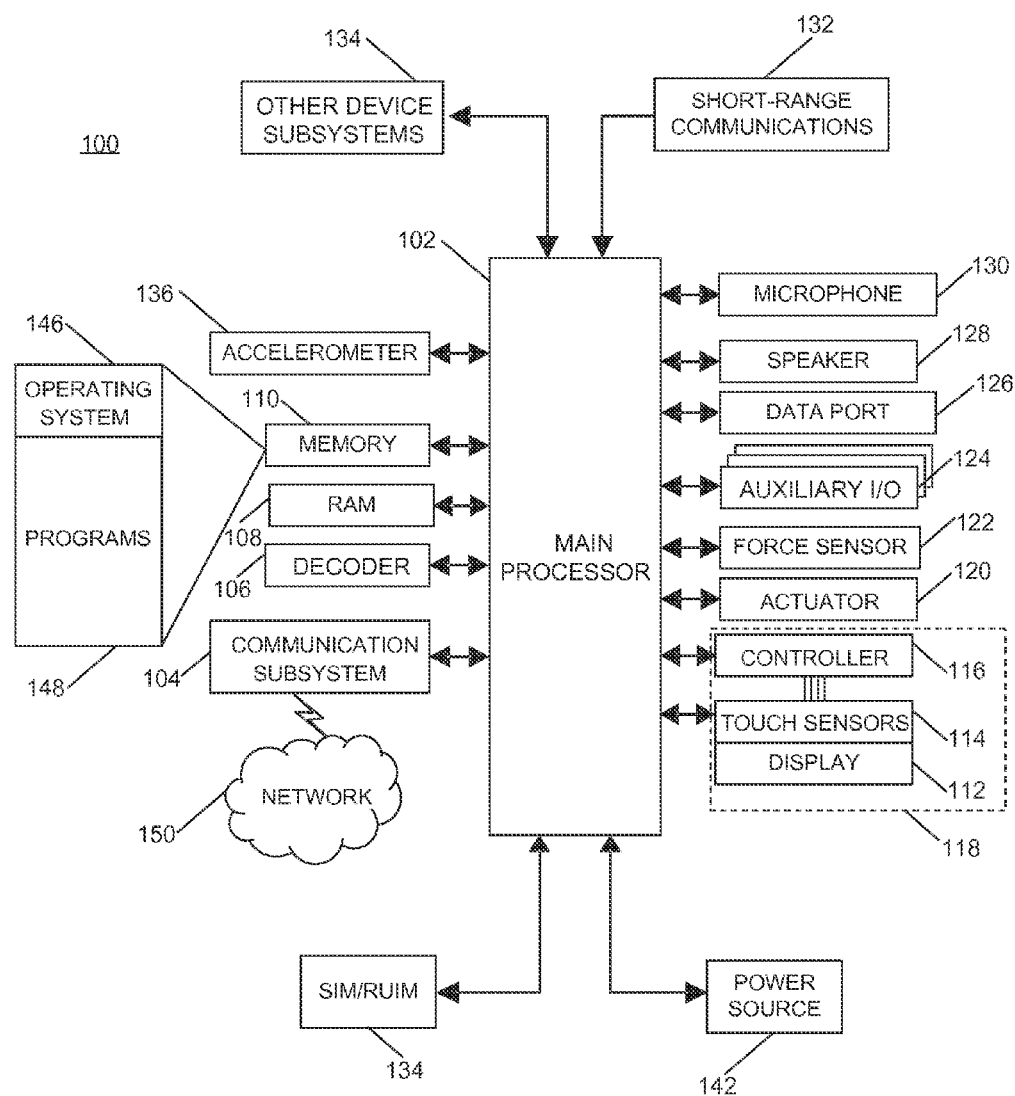
FIG. 1 is a block diagram of a portable electronic device in accordance with the disclosure.

The following describes a method and an electronic device that includes a touch controller, sense electrodes operably coupled to the touch controller, a display controller operably coupled to the touch controller to communicate with the touch controller to detect touches, and drive electrodes operably coupled to the touch controller when the electronic device is operating in a reduced power condition and operably coupled to the display controller when the electronic device is operating in a normal power condition.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may also be a portable electronic device without wireless communication capabilities, such as a handheld electronic game device, digital photograph album, digital camera, media player, e-book reader, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are operably coupled to a touch controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
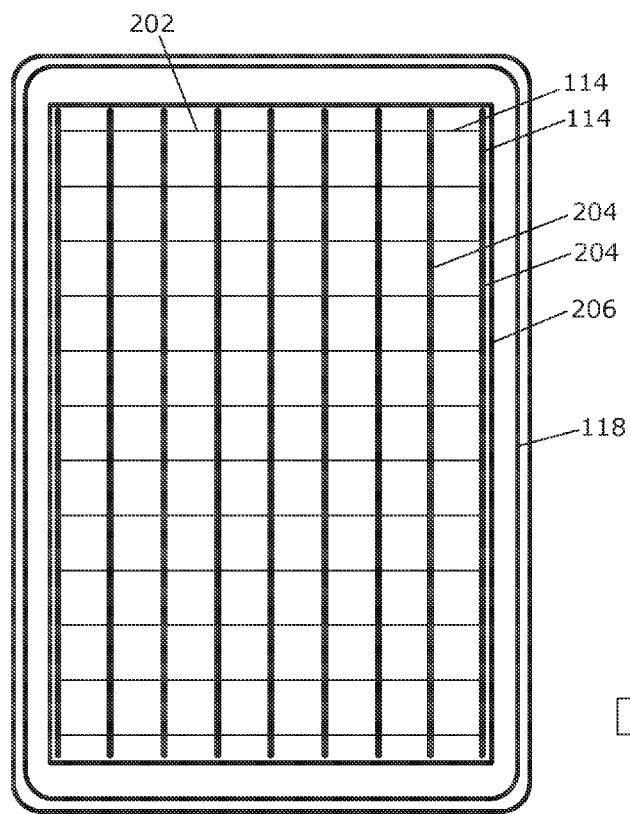
FIG. 2 is a front view of one example of an electronic device in accordance with the disclosure.

A front view of an example of the electronic device 100 is shown in FIG. 2. The electronic device 100 includes the touch-sensitive display 118. The touch-sensitive display 118 may be a capacitive touch-sensitive display that includes capacitive touch sensors that includes drive electrodes, also referred to as scanning electrodes, and sense electrodes. The display 112 includes electrodes 202 that are utilized as common electrodes. The electrodes 202 are also utilized as drive electrodes for touch sensing. Thus, in this example, the electrodes 202 function as common electrodes and drive electrodes and are operably coupled to a display controller 404 that is part of the display 112. The sense electrodes 204 are generally illustrated as linear electrodes. Any other suitable shape may be utilized. For example, the sense electrodes 204 may be generally U-shaped. The sense electrodes are operably coupled to the touch controller 116.

The touch-sensitive display 118 includes a display area in which information may be displayed, and a non-display area extending around the periphery of the display area. The display area includes the area inside the rectangle 206 in FIG. 2. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. The electrodes 202 and the sense electrodes 204 may be disposed in the non-display area, which electrodes 202 and sense electrodes 204 may extend from the electrodes 202 and the sense electrodes 204 in the display area or may be distinct or separate from the electrodes 202 and sense electrodes 204 in the display area. A touch, including a gesture, may be associated with the display area, the non-display area, or both areas. The electrodes 202 and the sense electrodes 204 may extend across substantially the entire non-display area or may be disposed in only part of the non-display area.

Figure 4:
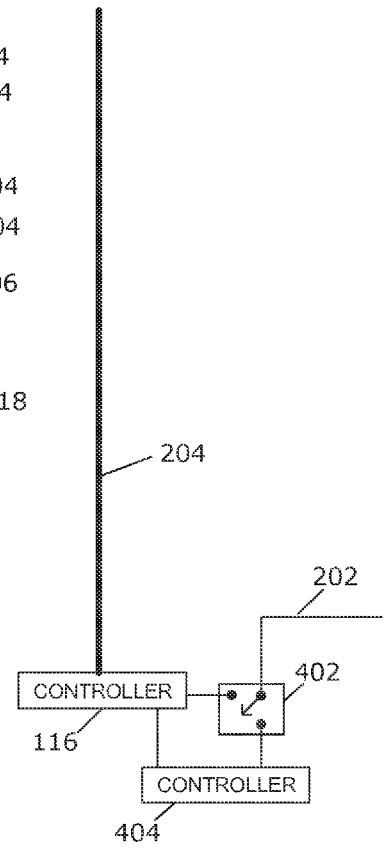
FIG. 4 is a diagram illustrating a sense electrode and a drive electrode operably coupled to controllers in accordance with the disclosure.

The electrodes 202 and the sense electrodes 204 may comprise any suitable material, such as indium tin oxide (ITO). The electrodes 202 and the sense electrodes 204 are not visible to the naked eye when viewing the electronic device 100 in a normal operating manner, but are shown in FIG. 2 through FIG. 4 for the purpose of illustration.

Figure 3:
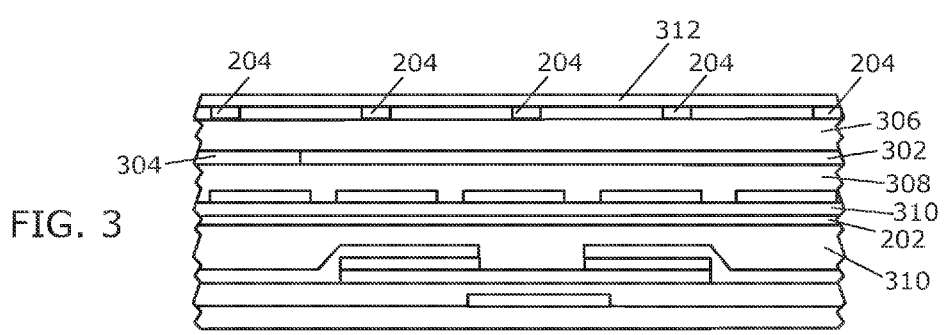
FIG. 3 is a partial cross section of one example of a touch-sensitive display in accordance with the disclosure.

A partial cross section of the touch-sensitive display 118 is shown in FIG. 3. The display 112 may include, for example, a color filter 302 and black matrix 304 disposed on a substrate 306. The display 112 may also include, for example, liquid crystal 308 disposed between pixel electrodes 310 and the color filter 302, and display elements including gate lines 312, a gate insulator 314, amorphous silicon semiconductor film 316, n-type amorphous silicon ($n^+$-a-Si) film 318, source/drain electrodes 320, 322, an insulator 324, also known as an inter-layer dielectric, the common electrodes, referred to herein as electrodes 202, an upper insulator 326, all disposed on a substrate 328.

The sense electrodes 204 are disposed on the substrate 306, for example, by patterning ITO disposed on the substrate 306. Thus, the color filter 302 and black matrix 304 are disposed on one side of the substrate 306, and the sense electrodes 204 are disposed on the opposite side of the substrate 306. An outer polarizer 330 is disposed on the sense electrodes 204.

The drive electrodes 202 are operably coupled to the display controller when the electronic device 100 operates in a normal power condition. The drive electrodes 202 are operably coupled to the touch controller 116 when the electronic device 100 operates in a reduced power condition.

A diagram illustrating an electrode 202 and a sense electrode 204 is shown in FIG. 4. The sense electrode 204 is operably coupled to the touch controller 116, for example, by a flex connector. In this example, the drive electrodes 202 are operably coupled to a switch 402. The switch 402 is operably coupled to the display controller 404 and to the touch controller 116 to couple the drive electrodes 202 to the display controller 404 when the electronic device 100 is operating in a normal power condition, and to the touch controller 116 when the electronic device 100 is operating in a reduced power condition. The drive electrodes 202 may be operably coupled to the switch 402, for example, by a flex connector. The display controller 404 and the touch controller 116 are operably coupled together to communicate and coordinate driving of the drive electrodes 202 while sensing with the sense electrodes 114 when the electronic device 100 is operating in the normal operating condition. The touch controller 116 may control the display controller 404 by sending signals to the display controller 404 to control the timing of driving the drive electrodes 202 while sensing utilizing the sense electrodes 114. The switch 402 is controlled by the touch controller 116 based on commands received from the processor 102. In the above example, the switch is a discrete switch. Alternatively, the switch may be a software switch that controls which controller 116, 404 drives the electrodes 202. The electrodes 202 and controller 116, 404 outputs may be operably coupled to one or more inputs or ports that are controlled by the processor 102, touch controller 116, or other device.

The electrodes 202 and the sense electrodes 204 may be utilized to detect a touch by mutual-capacitance touch sensing. To detect a touch when the electronic device 100 is operating in a normal power condition, the switch 402 couples the electrodes 202 to the display controller 404. The electrodes 202 are driven by the display controller 404 such that pulses of signal are carried by the electrodes 202. The signal may be current or applied voltage. The sense electrodes 204 are utilized to detect changes in the signal at the nodes, which are the locations at which the sense electrodes 204 cross over the electrodes 202. To determine a touch location, a scanning operation is performed on the touch-sensitive display 118 by driving the electrodes 202 while signals from sense electrodes 204 are received by the touch controller 116. A scan of the touch-sensitive display 118 includes multiple frames. In a frame, an electrode 202 is driven utilizing multiple pulses, while receiving signals from a sense electrode 204. An electrode 202 may be driven in multiple frames of a scan while sensing utilizing the sense electrodes 204.

To operate in a reduced power condition, the display 112, including the display controller 404, may be powered down to operate in a standby mode, or at reduced power. Reduced power condition, or low power condition, which may be referred to as a "sleep" condition or state, is a condition in which no information is typically displayed on the touch-sensitive display. During reduced power condition, other processes with the electronic device 100 may be discontinued or operated at a slower speed, and one or more hardware components may be powered-down or operated at a slower speed to conserve power or provide other advantages. The electronic device 100 may enter or begin operating in reduced power condition when the processor 102 determines that no touch is detected on the touch-sensitive display 118 for a predetermined period of time, when no input is generally detected by the electronic device 100 for predetermined period of time, when the device is locked by selection of a button or receipt of a gesture on the touch-sensitive display 118, or when the device is placed in a holster or covered by a cover, to name a few examples.

To detect a touch when the display 112 is operating in a reduced power condition, and the display controller 404 is not driving the electrodes 202, the switch 402 operably couples the electrodes 202 to the touch controller 116. The electrodes 202 are driven by the touch controller 116 and the signals are received at the touch controller 116 from the sense electrodes 204.

Figure 5:
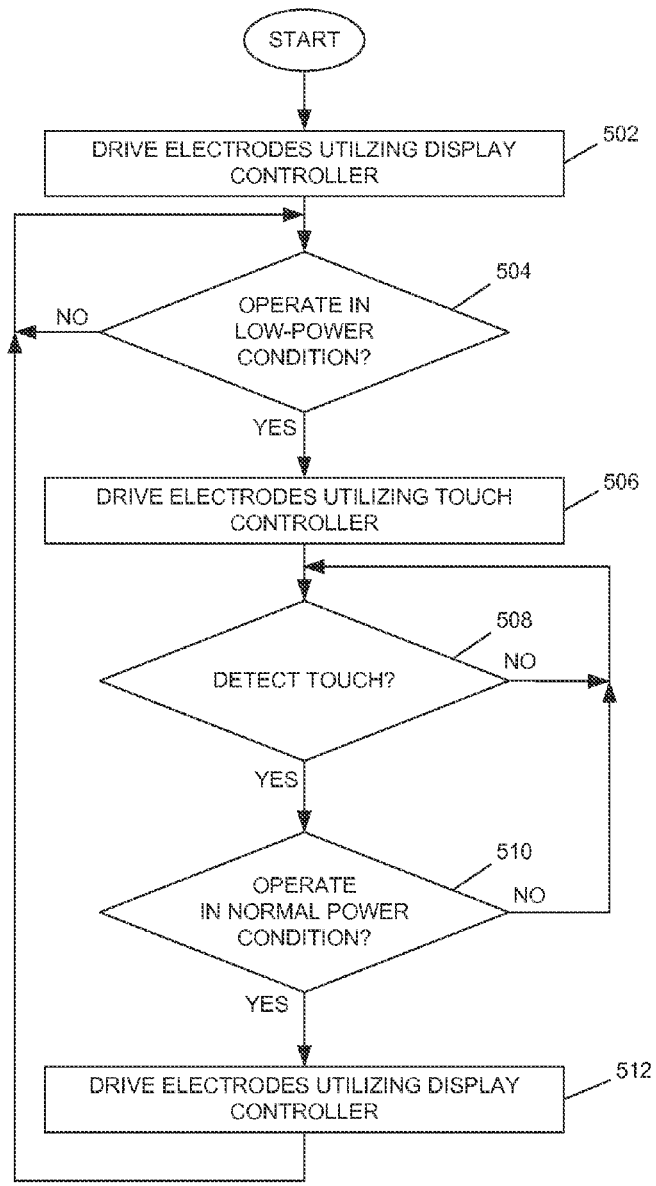
FIG. 5 is a flowchart illustrating an example of a method of detecting touches on a touch-sensitive display in accordance with the disclosure.

A flowchart illustrating an example of a method of detecting touches on the touch-sensitive display 118 is shown in FIG. 5. The method may be carried out by software executed, for example, by the processor 102 and/or the touch controller 116. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium, device, or apparatus, which may be a non-transitory or tangible storage medium.

While the portable electronic device 100 operates in a normal power condition, the electrodes 202 are operably coupled to the display controller 404. In normal power condition, the display displays information. The electrodes 202 are driven by the display controller 404 while signals from the sense electrodes 204 are received by the touch controller 116. The touch controller 116 is operably coupled to the display controller 404 to control the timing of driving and sensing during touch detection when operating in normal power condition.

When the device 100 enters a reduced power condition 504, the process continues at 506, and the electrodes 202 are driven by the touch controller 116. Thus, in response to detecting entry into reduced power condition, the electrodes 202 are operably coupled or switched to being driven by the touch controller 116. An indication or command to operate in reduced power condition may be sent from the processor 102 to the touch controller 116 and the display controller 404. During operation of the portable electronic device 100 in a reduced power condition, the switch 402 couples the electrodes 202 to the touch controller 116. The electrodes 202 are driven by the touch controller 116 while signals from the sense electrodes 204 are received at the touch controller 116. In reduced power condition, the display 112, including the display controller 404 is powered down by reducing power to the display or by the display going to "sleep" and the display controller 404 is not utilized to drive the electrodes 202.

When a touch is detected 508, the touch data is compared to stored touch data to determine 510 when the touch is an input to trigger or initiate operation in normal power condition by "waking up" or powering up the display 112 and the display controller 404. The touch may be a gesture to return to normal power condition, for example, to unlock the electronic device 100, to engage full operation of the electronic device 100, or to wake up the electronic device 100. In response to detecting entry into normal power condition, the electrodes 202 are operably coupled to the display controller 404.

To return to normal power condition, the touch controller 116 sends an indication or a command to the display controller 404 to power up the display 112, including the display controller 404. The touch controller 116 switches 512 the switch 402 to couple the electrodes 202 to the display controller 404 again. The touch controller 116 may also send a signal to the processor 102 to "wake up" or power up the processor 102.

Changing or switching between the display controller and the touch controller as the driver for the electrodes, touch detection is facilitated in both normal power condition and reduced/low power condition. Thus, touches, including gestures, may be detected by driving the electrodes utilizing the touch controller 116. In an electronic device 100 that includes touch sensors integrated or formed in the display, such as an in-cell touch-sensitive display 118, touches may be detected, and gestures, as well as gesture direction, may be determined without need to utilize the display controller to drive the electrodes 202. Thus, touches, including gestures, that wake up or power up the electronic device 100 may be detected when the electronic device 100 is in a low power or reduced power condition, and the display, including the display controller, need not be utilized. Power utilized by the display controller, also referred to as the display driver, may be very high compared to the touch controller. Thus, turning off the display controller reduces power consumption.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. An electronic device comprising:
    a touch controller;
    sense electrodes operably coupled to the touch controller;
    a display controller operably coupled to a display to display information on the electronic device in a normal power condition and operably coupled to the touch controller to communicate with the touch controller to detect touches;
    drive electrodes that:
        when the electronic device is operating in a reduced power condition, are operably coupled to the touch controller by a switch and are driven by the touch controller applying signal pulses to the drive electrodes to detect touches; and
        when the electronic device is operating in the normal power condition, are operably coupled to the display controller by the switch and are driven by the display controller applying signal pulses to the drive electrodes to detect touches;
    wherein the display controller is powered down when the electronic device is operating in the reduced power condition; and
    wherein, in the normal power condition, the touch controller signals the display controller to control a timing of driving the drive electrodes while sensing utilizing the sense electrodes.

2. The electronic device according to claim 1, wherein the drive electrodes comprise common electrodes utilized to display information on the electronic device.

3. The electronic device according to claim 1, wherein the touch controller controls the display controller to detect touches on the electronic device when the electronic device is operating in the normal power condition.

4. The electronic device according to claim 1, wherein the touch controller sends a signal to the display controller to power up the display controller to change from operating the electronic device in the reduced power condition to operating the electronic device in the normal power condition.

5. The electronic device according to claim 1, comprising a display including the display controller, wherein the display is not utilized to display information when the electronic device is operating in the reduced power condition.

6. The electronic device according to claim 1, comprising a processor operably coupled to the touch controller and to the display controller to control entry of the electronic device into the reduced power condition.

7. A method comprising:
    in a normal mode:
        displaying information on the electronic device by a display controller operably coupled to a display;
        detecting touches on a touch-sensitive display by sensing utilizing first electrodes operably coupled to a touch controller while a display controller applies signal pulses to second electrodes that are operably coupled by a switch to the display controller to drive the second electrodes; and
    while in a reduced power condition, detecting touches on the touch-sensitive display by sensing utilizing the first electrodes operably coupled to the touch controller while the touch controller applies signal pulses to the second electrodes that are operatively coupled by the switch to the touch controller to drive the second electrodes;
    wherein, in the normal power condition, controlling a timing of driving the second electrodes by the display controller while sensing utilizing the first electrodes; and
    powering down the display controller when the electronic device enters the reduced power condition.

8. The method according to claim 7, comprising coupling the second electrodes to the display controller in response to detecting entry into a normal power condition.

9. The method according to claim 7, comprising switching the switch from coupling the second electrodes to the touch controller to coupling the second electrodes to the display controller when entering a normal power condition from the reduced power condition.

10. The method according to claim 7, comprising utilizing the second electrodes as common electrodes to display information on the electronic device.

11. The method according to claim 7, wherein the display controller is not utilized to detect touches when in the reduced power condition.

12. The method according to claim 7, wherein entry into the reduced power condition is controlled by a processor operably coupled to the touch controller and to the display controller.

13. A non-transitory computer-readable storage device having computer-readable code stored thereon, the computer-readable code executable by at least one processor of the portable electronic device to perform a method comprising:
    in a normal mode:
        displaying information on the electronic device by a display controller operably coupled to a display;
        detecting touches on a touch-sensitive display by sensing utilizing first electrodes operably coupled to a touch controller while a display controller applies signal pulses to second electrodes that are operably coupled by a switch to the display controller to drive the second electrodes; and
    while in a reduced power condition, detecting touches on the touch-sensitive display by sensing utilizing the first electrodes operably coupled to the touch controller while the touch controller applies signal pulses to the second electrodes that are operatively coupled by the switch to the touch controller to drive the second electrodes;
    wherein, in the normal power condition, controlling a timing of driving the second electrodes by the display controller while sensing utilizing the first electrodes; and powering down the display controller when the electronic device enters the reduced power condition.

* * * * *